US012640790B2

(12) United States Patent
Rahman et al.

(10) Patent No.: US 12,640,790 B2
(45) Date of Patent: May 26, 2026

(54) METHOD AND APPARATUS FOR REPORTING OF TIME-DOMAIN CHANNEL PROPERTIES

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 572 days.

(21) Appl. No.: 18/154,767

(22) Filed: Jan. 13, 2023

(65) Prior Publication Data

US 2023/0246687 A1      Aug. 3, 2023

Related U.S. Application Data

(60) Provisional application No. 63/328,605, filed on Apr. 7, 2022, provisional application No. 63/304,408, filed on Jan. 28, 2022.

(51) Int. Cl.
H04B 7/06           (2006.01)
(52) U.S. Cl.
CPC ......... H04B 7/0626 (2013.01); H04B 7/0632 (2013.01); H04B 7/0639 (2013.01)
(58) Field of Classification Search
CPC .. H04B 7/0626; H04B 7/0632; H04B 7/0639; H04B 7/0695; H04B 7/063; H04L 5/0048; H04W 24/08; H04W 72/0446
See application file for complete search history.

(56) References Cited

U.S. PATENT DOCUMENTS

| | | | | |
|---|---|---|---|---|
| 11,166,186 B2 * | 11/2021 | Onggosanusi | ....... | H04B 7/0413 |
| 2009/0185607 A1 | 7/2009 | Lee | | |
| 2019/0281487 A1 | 9/2019 | Liu | | |
| 2021/0105753 A1 | 4/2021 | Zhang | | |
| 2023/0239029 A1 * | 7/2023 | Rahman | ............... | H04B 7/0626 |
| | | | | 370/252 |
| 2024/0421877 A1 * | 12/2024 | Frenne | ................. | H04B 7/0626 |

FOREIGN PATENT DOCUMENTS

| | | | |
|---|---|---|---|
| WO | 2020030848 A1 | 2/2020 |
| WO | 2021161220 A1 | 8/2021 |
| WO | 2023089593 A1 | 5/2023 |

OTHER PUBLICATIONS

International Search Report and Written Opinion issued Apr. 26, 2023 regarding International Application No. PCT/KR2023/001133, 6 pages.

(Continued)

*Primary Examiner* — Charles C Jiang
*Assistant Examiner* — Rachel Elizabeth Marks

(57)           ABSTRACT

Apparatuses and methods for reporting of time-domain channel properties are provided. A method for operating a user equipment (UE) includes receiving a configuration about a channel state information (CSI) report. The configuration including information about non-zero power (NZP) CSI-reference signal (RS) resources and a parameter reportQuantity set to a time-domain channel property (TDCP). The method further includes, based on the configuration, measuring the NZP CSI-RS resources and determining the TDCP based on the measurement. The method further includes transmitting the CSI report including an indicator indicating the TDCP.

20 Claims, 14 Drawing Sheets

1700

Receive a configuration about a CSI report including information about NZP CSI-RS resources and a parameter *reportQuantity* set to a TDCP — 1710

Measure the NZP CSI-RS resources — 1720

Determine the TDCP based on the measurement — 1730

Transmit the CSI report including an indicator indicating the TDCP — 1740

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Oct. 2021, 144 pages.

"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Fraunhofer Iis, et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

Supplementary European Search Report dated Nov. 24, 2026, in connection with European Patent Application No. 23747310.3, 10 pages.

Samsung, " New Wid: Mimo Evolution for Downlink and Uplink," 3GPP TSG RAN Meeting #94e, Electronic Meeting, Dec. 2021, RP-213598 (revision of RP-213517), 6 pages.

Google, " On CSI Enhancement," 3GPP TSG RAN WG1 #111, Toulouse, France, Nov. 2022, R1-2211118, 17 pages.

* cited by examiner

600

700

1300

3D grid of beams in
(1$^{st}$ port dim., 2$^{nd}$ port dim., freq. dim.)

$O_3N_3$-1

$O_2N_2$-1

Frequency dim.

2$^{nd}$ port dim.

0   1

1

0

0   1   2

$O_1N_1$-1

1$^{st}$ port dim.

1700

Receive a configuration about a CSI report including information about NZP CSI-RS resources and a parameter *reportQuantity* set to a TDCP — 1710

Measure the NZP CSI-RS resources — 1720

Determine the TDCP based on the measurement — 1730

Transmit the CSI report including an indicator indicating the TDCP — 1740

METHOD AND APPARATUS FOR REPORTING OF TIME-DOMAIN CHANNEL PROPERTIES

CROSS-REFERENCE TO RELATED APPLICATION AND CLAIM OF PRIORITY

This application claims priority under 35 U.S.C. § 119(e) to U.S. Provisional Patent Application No. 63/304,408 filed on Jan. 28, 2022, and U.S. Provisional Patent Application No. 63/328,605 filed on Apr. 7, 2022. The above-identified provisional patent applications are hereby incorporated by reference in their entirety.

TECHNICAL FIELD

The present disclosure relates generally to wireless communication systems and, more specifically, to reporting of time-domain channel properties.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for reporting of time-domain channel properties.

In one embodiment, a user equipment (UE) is provided. The UE includes a transceiver configured to receive a configuration about a channel state information (CSI) report. The configuration includes information about non-zero power (NZP) CSI-reference signal (RS) resources and a parameter reportQuantity set to a time-domain channel property (TDCP). The UE further includes a processor operably coupled to the transceiver. The processor, based on the configuration, is configured to measure the NZP CSI-RS resources and determine the TDCP based on the measurement. The transceiver is further configured to transmit the CSI report including an indicator indicating the TDCP.

In another embodiment, a base station (BS) is provided. The BS includes a processor and a transceiver operably coupled to the processor. The transceiver is configured to transmit a configuration about a CSI report. The configuration including information about non-zero power NZP CSI-RS resources and a parameter reportQuantity set to a TDCP. The transceiver is further configured to transmit the NZP CSI-RS resources, and receive the CSI report including an indicator indicating the TDCP that is based on the NZP CSI-RS resources.

In yet another embodiment, a method for operating a UE is provided. The method includes receiving a configuration about a CSI report. The configuration including information about NZP CSI-RS resources and a parameter reportQuantity set to a TDCP. The method further includes, based on the configuration, measuring the NZP CSI-RS resources and determining the TDCP based on the measurement; and transmitting the CSI report including an indicator indicating the TDCP.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
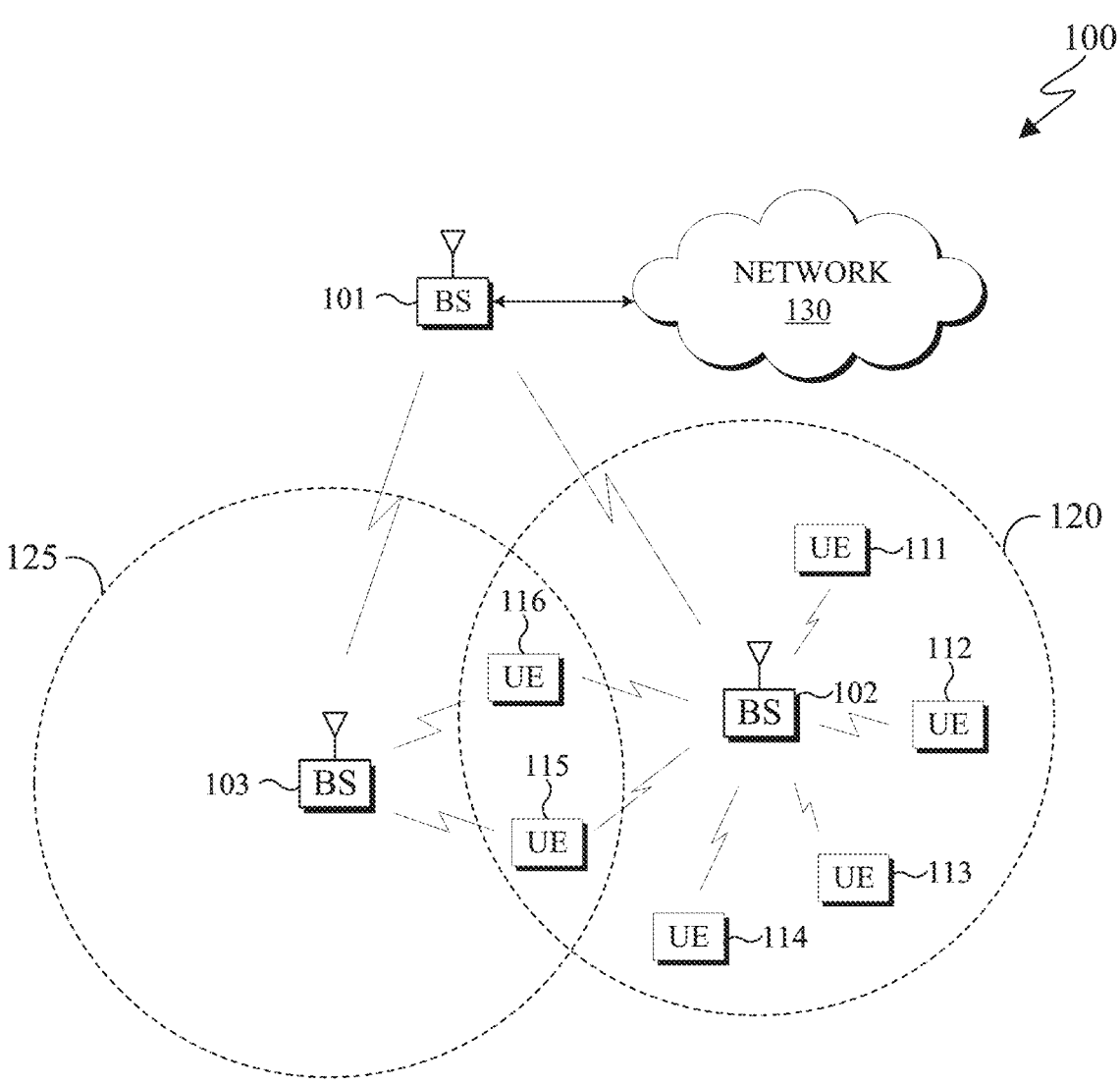
FIG. 1 illustrates an example wireless network according to embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0; "NR, Physical Layer Procedures for Data" (herein "REF 8"); RP-192978, "Measurement results on Doppler spectrum for various UE mobility environments and related CSI enhancements," Fraunhofer IIS, Fraunhofer Deutsche Telekom (herein "REF 9"); 3GPP TS 38.211 v17.0.0, "E-UTRA, NR, Physical channels and modulation" (herein "REF 10")

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
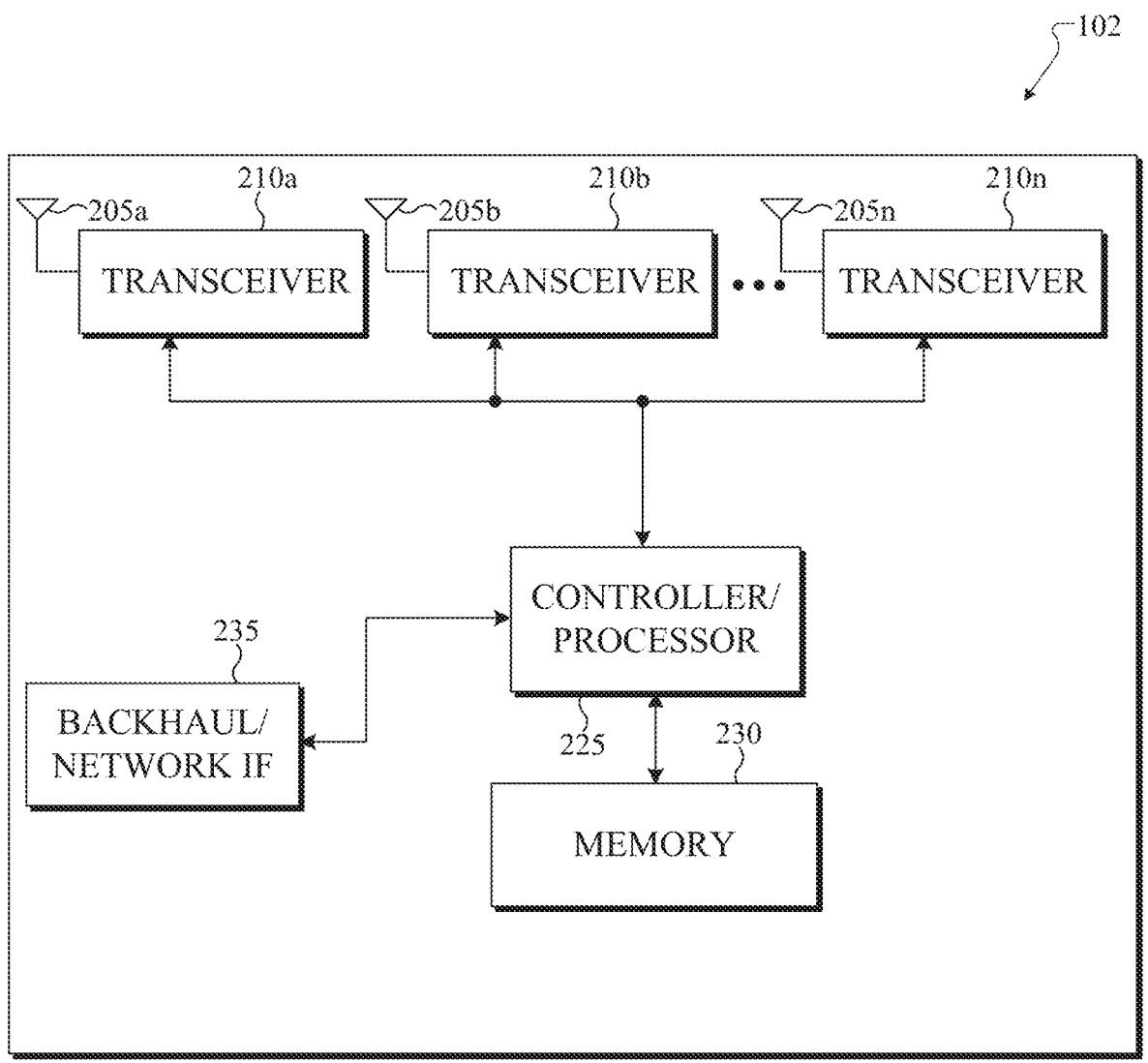
FIG. 2 illustrates an example gNB according to embodiments of the present disclosure.
Figure 3:
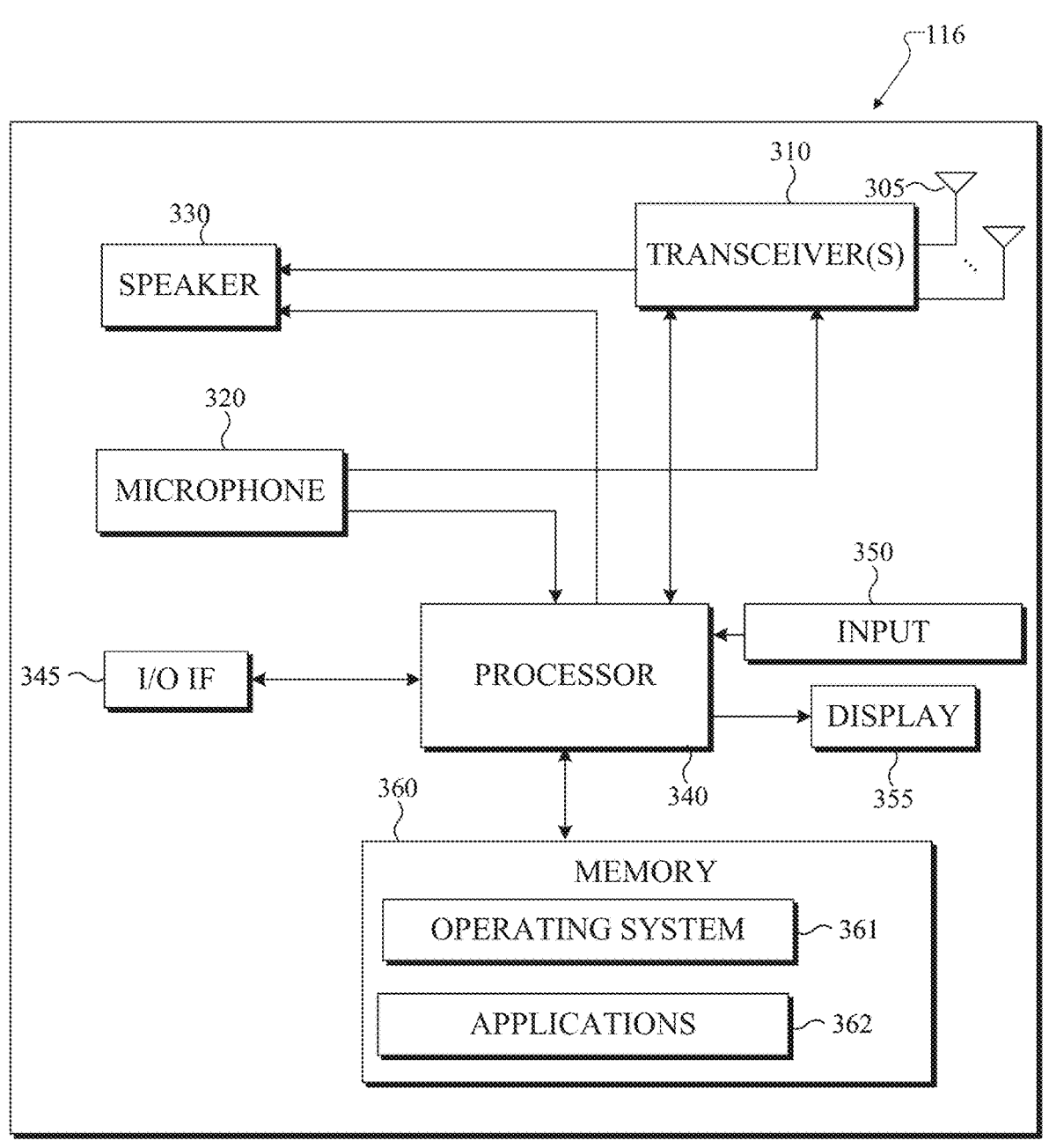
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for reporting of time-domain channel properties. In certain embodiments, one or more of the BSs 101-103 include circuitry, programing, or a combination thereof for reporting of time-domain channel properties.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink transmission in full duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
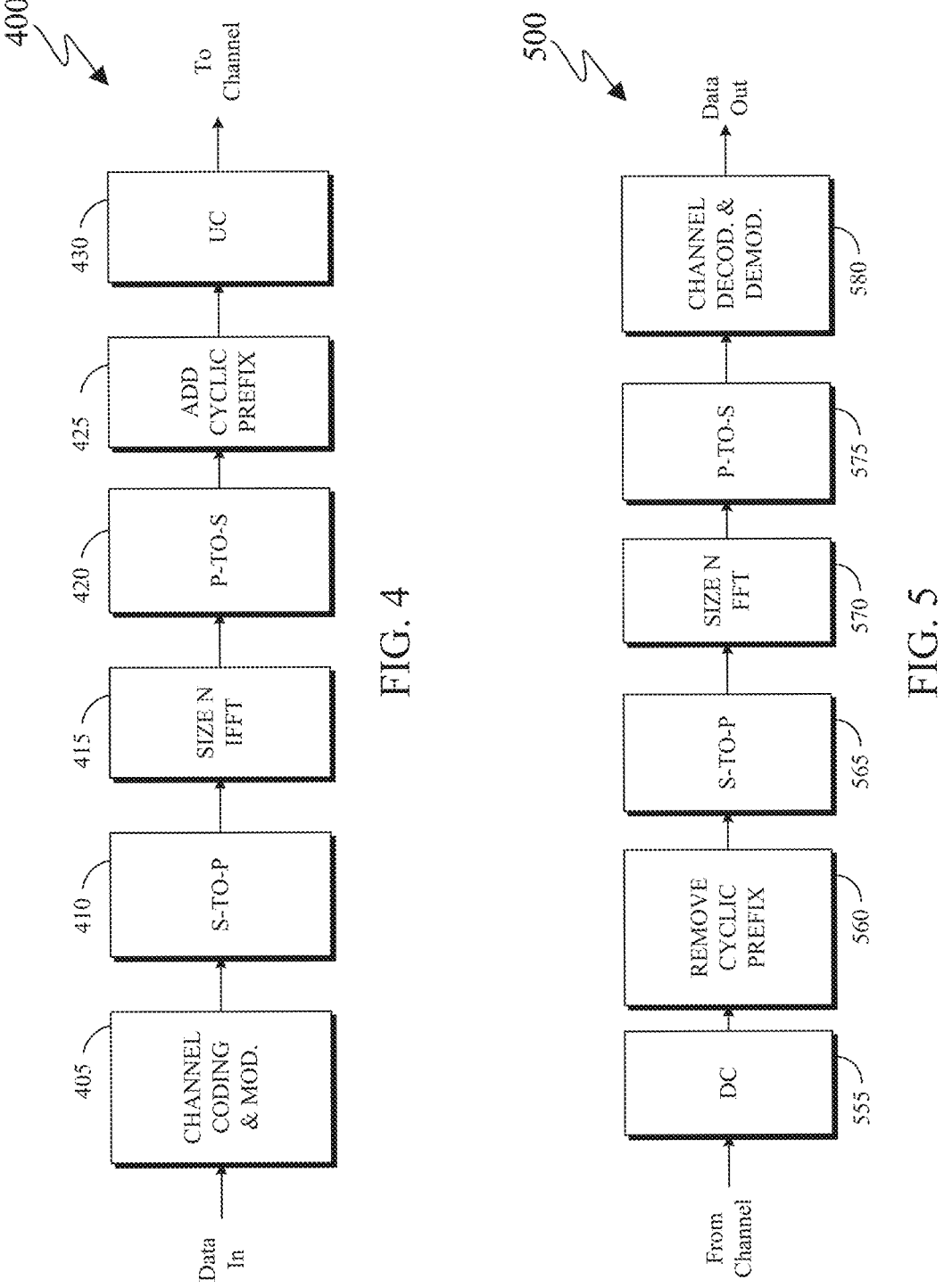
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support reporting of time-domain channel properties as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH)—see also REF 3. An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $$N_{sc}^{RB}$$

sub-carriers, or resource elements (REs), such as 12 REs. A unit of one RB over one subframe is referred to as a PRB. A UE can be allocated $$M_{PDSCH} RBs \text{ for a total of } M_{sc}^{PDSCH} = M_{PDSCH} \cdot N_{sc}^{RB}$$

REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH (see also REF 3).

An UL subframe includes two slots. Each slot includes $$N_{symb}^{UL}$$

symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}=1$. A last subframe symbol can be used to multiplex SRS transmissions from one or more UEs. A number of subframe symbols that are available for data/UCI/DMRS transmission is $$N_{symb} = 2 \cdot (N_{symb}^{UL} - 1) - N_{SRS},$$

where $N_{SRS}=1$ if a last subframe symbol is used to transmit SRS and $N_{SRS}=0$ otherwise.

Figure 6:
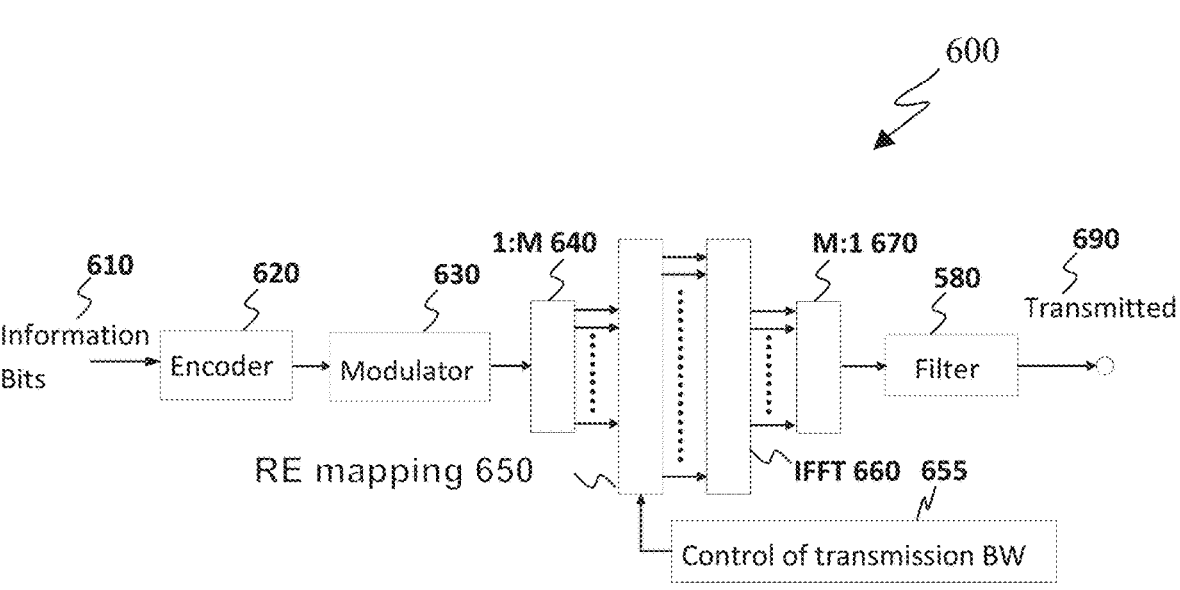
FIG. 6 illustrates a transmitter block diagram for a physical downlink shared channel (PDSCH) in a subframe according to embodiments of the present disclosure.

FIG. 6 illustrates a transmitter block diagram 600 for a PDSCH in a subframe according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
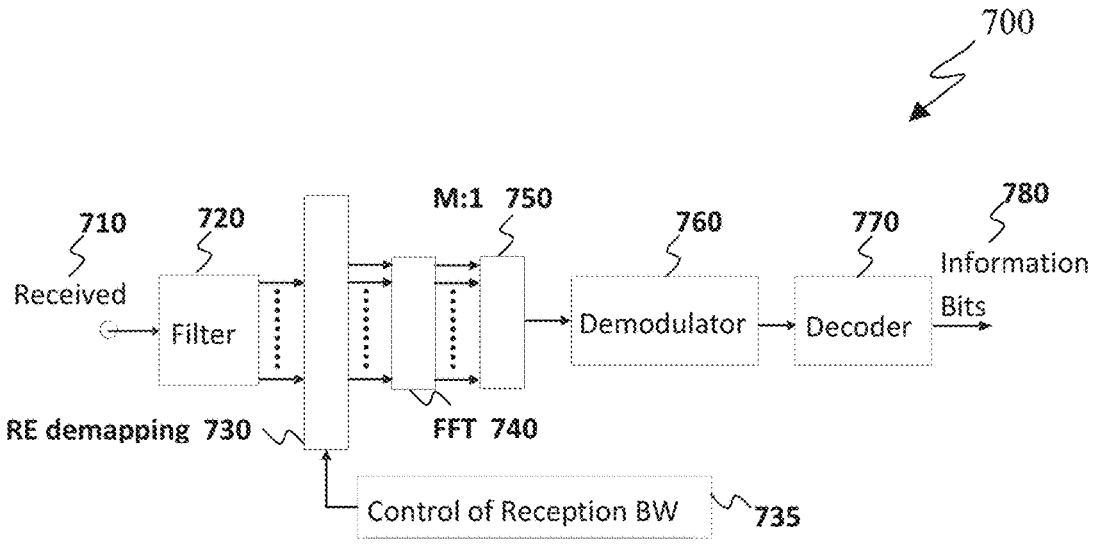
FIG. 7 illustrates a receiver block diagram for a PDSCH in a subframe according to embodiments of the present disclosure.

FIG. 7 illustrates a receiver block diagram 700 for a PDSCH in a subframe according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
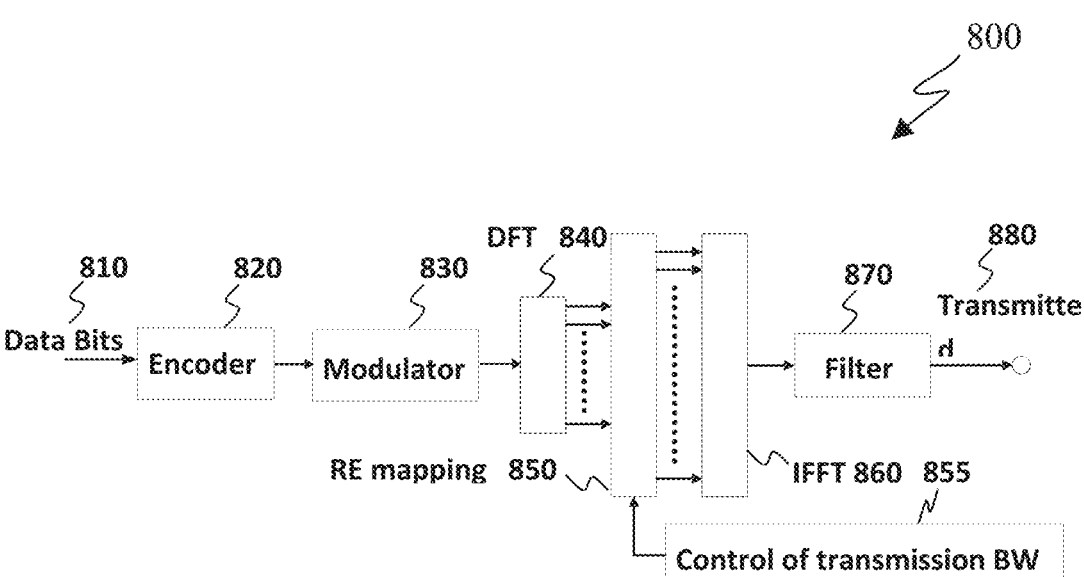
FIG. 8 illustrates a transmitter block diagram for a physical uplink shared channel (PUSCH) in a subframe according to embodiments of the present disclosure.

FIG. 8 illustrates a transmitter block diagram 800 for a PUSCH in a subframe according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
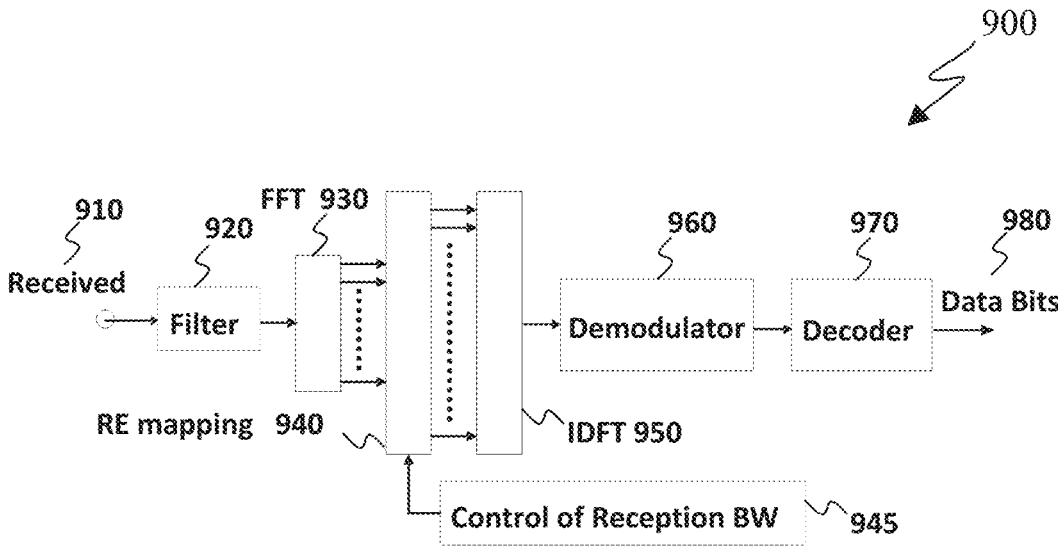
FIG. 9 illustrates a receiver block diagram for a PUSCH in a subframe according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km² with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 10:
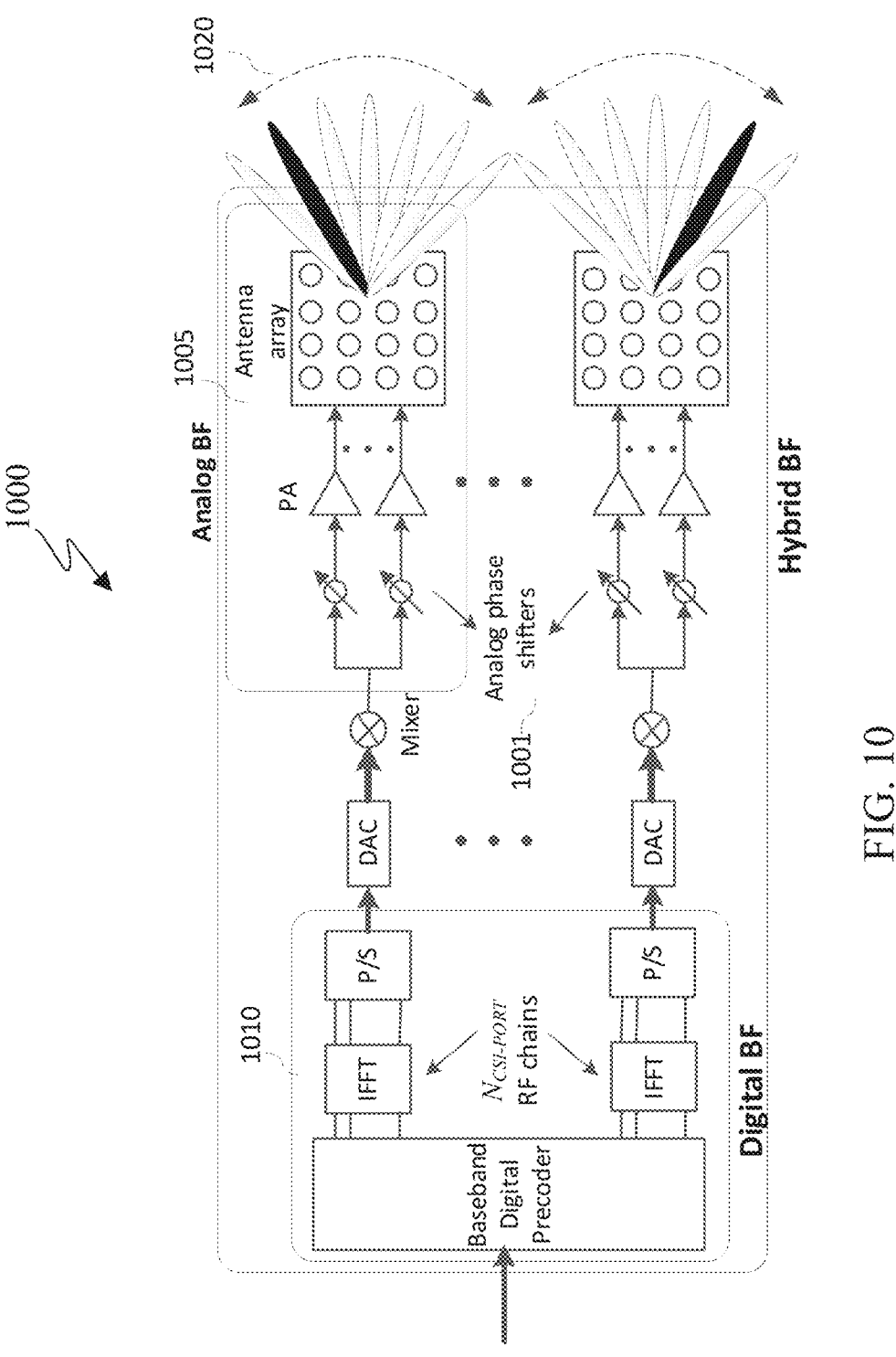
FIG. 10 illustrates an example antenna blocks or arrays forming beams according to embodiments of the present disclosure.

FIG. 10 illustrates an example antenna blocks or arrays 1000 according to embodiments of the present disclosure. The embodiment of the antenna blocks or arrays 1000 illustrated in FIG. 10 is for illustration only. FIG. 10 does not limit the scope of this disclosure to any particular implementation of the antenna blocks or arrays.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports $N_{CSI-PORT}$. A digital beamforming unit 1010 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanism corresponding to three types of CSI-RS measurement can be considered: 1) 'CLASS A' CSI reporting which corresponds to non-precoded CSI-RS, 2) 'CLASS B' reporting with K=1 CSI-RS resource which corresponds to UE-specific beamformed CSI-RS, 3) 'CLASS B' reporting with K>1 CSI-RS resources which corresponds to cell-specific beamformed CSI-RS. For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (including multiple ports). Here, (at least at a given time/frequency) CSI-RS ports have narrow beam widths and hence not cell wide coverage, and (at least from the eNB (or gNB) perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of its representation thereof). To facilitate such a procedure, a first BF CSI-RS transmitted with periodicity T1 (ms), and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is 'implicit' in the form of CQI/PMI/RI (also CRI and LI) derived from a codebook assuming SU transmission from eNB (or gNB).

In 5G or NR systems [REF7, REF8], the above-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $W_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2} CSI-RS$$

ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17, such a codebook is supported (which is referred to as Rel. 17 further enhanced Type II port selection codebook in REFS).

Figure 11:
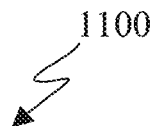
FIG. 11 illustrates channel measurement with and without Doppler components according to embodiments of the present disclosure.
Figure 11:
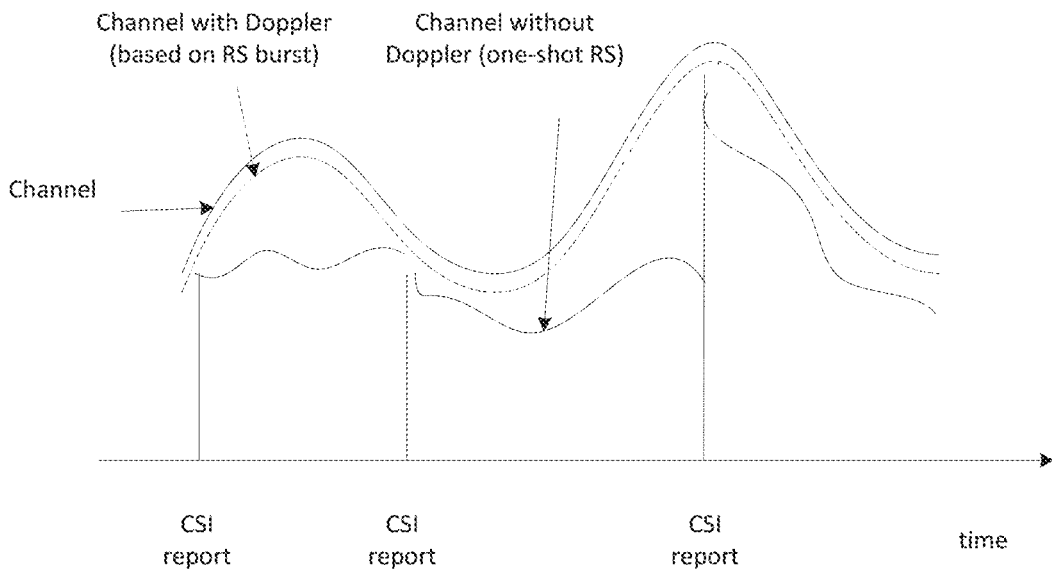

FIG. 11 illustrates channel measurement with and without Doppler components 1100 according to embodiments of the present disclosure. The embodiment of the channel measurement with and without Doppler components 1100 illustrated in FIG. 11 is for illustration only. FIG. 11 does not limit the scope of this disclosure to any particular implementation of the channel measurement with and without Doppler components.

When the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REFS], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Alternatively, the gNB can use the obtained Doppler components of the UL channel to beamform CSI-RS for CSI reporting by the UE. An illustration of channel measurement with and without Doppler components is shown in FIG. 11. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 12:
FIG. 12 illustrates an example antenna port layout according to embodiments of the present disclosure.
Figure 12:
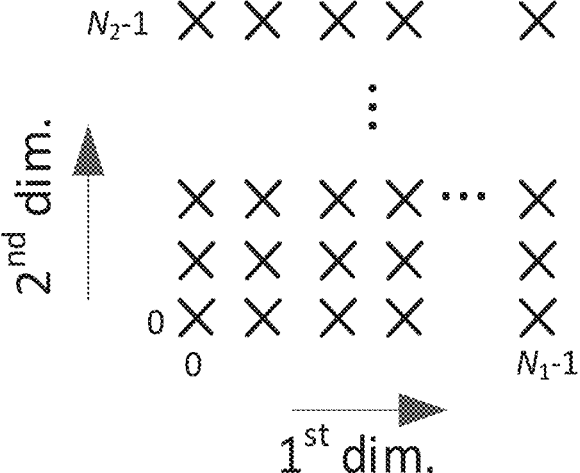

FIG. 12 illustrates an example antenna port layout 1200 according to embodiments of the present disclosure. The embodiment of the antenna port layout 1200 illustrated in FIG. 12 is for illustration only. FIG. 12 does not limit the scope of this disclosure to any particular implementation of the antenna port layout.

As illustrated in FIG. 12, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1/N_2$ when each antenna maps to an antenna port. An illustration is shown in FIG. 12 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ).

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 13:
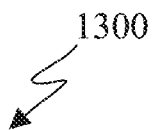
FIG. 13 illustrates a 3D grid of oversampled discrete Fourier transform (DFT) beams according to embodiments of the present disclosure.

FIG. 13 illustrates a 3D grid of oversampled DFT beams 1300 according to embodiments of the present disclosure. The embodiment of the 3D grid of oversampled DFT beams 1300 illustrated in FIG. 13 is for illustration only. FIG. 13 does not limit the scope of this disclosure to any particular implementation of the 3D grid of oversampled DFT beams.

As illustrated, FIG. 13 shows a 3D grid 1300 of the oversampled DFT beams (1st port dim., 2nd port dim., freq. dim.) in which 1st dimension is associated with the 1st port dimension, 2nd dimension is associated with the 2nd port dimension, and 3rd dimension is associated with the frequency dimension.

The basis sets for 1st and 2nd port domain representation are oversampled DFT codebooks of length-N1 and length-N2, respectively, and with oversampling factors O1 and O2, respectively. Likewise, the basis set for frequency domain representation (i.e., 3rd dimension) is an oversampled DFT codebook of length-N3 and with oversampling factor O3. In one example, O1=O2=O3=4. In one example, O1=O2=4 and O3=1. In another example, the oversampling factors Oi belongs to {2, 4, 8}. In yet another example, at least one of O1, O2, and O3 is higher layer configured (via RRC signaling).

As explained in Section 5.2.2.2.6 of REFS, a UE is configured with higher layer parameter codebookType set to ' typeII-PortSelection-r16' for an enhanced Type II CSI reporting in which the pre-coders for all SBs and for a given layer l=1, . . . , v, where v is the associated RI value, is given by either $$W^l = AC_lB^H = [a_0 \quad a_1 \quad \ldots \quad a_{L-1}]$$ (Eq. 1)

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \quad b_1 \quad \ldots \quad b_{M-1}]^H =$$

$$\sum_{f=0}^{M-1} \sum_{i=0}^{L-1} c_{l,i,f}\left(a_ib_f^H\right) = \sum_{i=0}^{L-1} \sum_{f=0}^{M-1} c_{l,i,f}\left(a_ib_f^H\right),$$

or $$W^l = \begin{bmatrix} A & 0 \\ 0 & A \end{bmatrix} C_lB^H = \begin{bmatrix} a_0 & a_1 & \ldots & a_{L-1} & & & & 0 \\ & & 0 & & a_0 & a_1 & \ldots & a_{L-1} \end{bmatrix}$$ (Eq. 2)

$$\begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 \quad b_1 \quad \ldots \quad b_{M-1}]^H =$$

$$\begin{bmatrix} \sum_{f=0}^{M-1} \sum_{i=0}^{L-1} c_{l,i,f}\left(a_ib_f^H\right) \\ \sum_{f=0}^{M-1} \sum_{i=0}^{L-1} c_{l,i+L,f}\left(a_ib_f^H\right) \end{bmatrix},$$

where $N_1$ is a number of antenna ports in a first antenna port dimension (having the same antenna polarization), $N_2$ is a number of antenna ports in a second antenna port dimension (having the same antenna polarization), $P_{CSI-RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/ component), $a_i$ is a $2N_1N_2 \times 1$ (Eq. 1) or $N_1N_2 \times 1$ (Eq. 2) column vector, or $a_i$ is a $P_{CSIRS} \times 1$ (Eq. 1) or $$\frac{P_{CSIRS}}{2} \times 1$$

port selection column vector, where a port selection vector is a defined as a vector which contains a value of 1 in one element and zeros elsewhere $b_f$ is a $N_3 \times 1$ column vector, $c_{i,j,f}$ is a complex coefficient.

In a variation, when the UE reports a subset K<2LM coefficients (where K is either fixed, configured by the gNB or reported by the UE), then the coefficient $C_{l,f}$ in precoder equations Eq. 1 or Eq. 2 is replaced with $x_{l,i,f} \times c_{l,i,f}$, where $x_{l,i,f}=1$ if the coefficient $c_{l,i,f}$ is reported by the UE according to some embodiments of this disclosure.

$x_{l,i,f}=0$ otherwise (i.e., is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}\left(a_ib_{i,f}^H\right)$$ (Eq. 3)

and

-continued $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix},$$ (Eq. 4)

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}} [\, W^1 \quad W^2 \quad \ldots \quad W^R \,].$$

Eq. 2 is assumed in the rest of the disclosure. The embodiments of the disclosure, however, are general and are also application to Eq. 1, Eq. 3, and Eq. 4.

Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M = N_3$, then B is an identity matrix, and hence not reported. Assuming $M < N_3$, in an example, to report columns of B, the oversampled DFT codebook is used. For instance, $b_f = w_f$, where the quantity $w_f$ is given by $$W_f = \begin{bmatrix} 1 & e^{j\frac{2\pi n_{3,l}^{(f)}}{O_3 N_3}} & e^{j\frac{2\pi \cdot 2n_{3,l}^{(f)}}{O_3 N_3}} & \ldots & e^{j\frac{2\pi \cdot (N_3-1)n_{3,l}^{(f)}}{O_3 N_3}} \end{bmatrix}^T.$$

When $O_3 = 1$, the FD basis vector for layer $l \in \{1, \ldots, v\}$ (where v is the RI or rank value) is given by $$w_f = \begin{bmatrix} y_{0,l}^{(f)} & y_{1,l}^{(f)} & \ldots & y_{N_3-1,l}^{(f)} \end{bmatrix}^T,$$

where $$y_{t,l}^{(f)} = e^{j\frac{2\pi t n_{3,l}^{(f)}}{N_3}} \text{ and } n_{3,l} = \begin{bmatrix} n_{3,l}^{(0)}, \ldots, n_{3,l}^{(M-1)} \end{bmatrix}$$

where $$n_{3,l}^{(f)} \in \{0, 1, \ldots, N_3 - 1\}.$$

In another example, discrete cosine transform DCT basis is used to construct/report basis B for the $3^{rd}$ dimension. The m-th column of the DCT compression matrix is simply given by $$[W_f]_{nm} = \begin{cases} \dfrac{1}{\sqrt{K}}, & n = 0 \\ \sqrt{\dfrac{2}{K}} \cos \dfrac{\pi(2m+1)n}{2K}, & n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H,$$ (Eq. 5)

where $A=W_1$ corresponds to the Rel. 15 $W_1$ in Type II CSI codebook [REFS], and $B=W_f$.

The $C_l = \tilde{W}_2$ matrix consists of all the required linear combination coefficients (e.g., amplitude and phase or real or imaginary). Each reported coefficient ($c_{l,i,f} = p_{l,i,f} \phi_{l,i,f}$) in $W_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to $\{2, 3, 4\}$. If multiple values for A are supported, then one value is configured via higher layer signaling. In another example, the amplitude coefficient ($p_{l,i,f}$) is reported as $$p_{l,i,f} = p_{l,i,f}^{(1)} p_{l,i,f}^{(2)}$$

where $$p_{l,i,f}^{(1)}$$

is a reference or first amplitude which is reported using an A1-bit amplitude codebook where A1 belongs to $\{2, 3, 4\}$, and $$p_{l,i,f}^{(2)}$$

is a differential or second amplitude which is reported using a A2-bit amplitude codebook where $A2 \leq A1$ belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

UE reports the following for the quantization of the NZ coefficients in $\tilde{W}_2$ a. A X-bit indicator for the strongest coefficient index $(i^*, f^*)$, where $X=\lceil \log_2 K_{NZ} \rceil$ or $\lceil \log_2 2L \rceil$.

i. Strongest coefficient $c_{l,i^*,f^*}=1$ (hence its amplitude/phase are not reported)

b. Two antenna polarization-specific reference amplitudes are used.

i. For the polarization associated with the strongest coefficient $c_{l,i^*,f^*}=1$, since the reference amplitude $$p_{l,i,f}^{(1)} = 1,$$

is not reported ii. For the other polarization, reference amplitude $$p_{l,i,f}^{(1)}$$

is quantized to 4 bits

1. The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \dots, \left(\frac{1}{2^{14}}\right)^{\frac{1}{4}} \right\}.$$

c. For $\{c_{l,i,f}(i, f)\neq(i^*, f^*)\}$:

i. For each polarization, differential amplitudes $$p_{l,i,f}^{(2)}$$

of the coefficients calculated relative to the associated polarization-specific reference amplitude and quantized to 3 bits 1. The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

2. Note: The final quantized amplitude $p_{l,i,f}$ is given by $$p_{l,i,f}^{(1)} \times p_{l,i,f}^{(2)}$$

ii. Each phase is quantized to either 8PSK ($N_{ph}=8$) or 16PSK ($N_{ph}=16$) (which is configurable).

For the polarization $r^*\in\{0,1\}$ associated with the strongest coefficient $c_{l,i^*,f^*}$, we have $$r^* = \left\lfloor \frac{i^*}{L} \right\rfloor$$

and the reference amplitude $$p_{l,i,f}^{(1)} = p_{l,r^*}^{(1)} = 1.$$

For the other polarization $r\in\{0,1\}$ and $r\neq r^*$, we have $$r = \left( \left\lfloor \frac{i^*}{L} \right\rfloor + 1 \right) \bmod 2$$

and the reference amplitude $$p_{l,i,f}^{(1)} = p_{l,r}^{(1)}$$

is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from $\{1,2\}$ and p is higher-layer configured from $\{\frac{1}{4}, \frac{1}{2}\}$. In one example, the p value is higher-layer configured for rank 1-2 CSI reporting. For rank>2 (e.g., rank 3-4), the p value (denoted by $v_0$) can be different. In one example, for rank 1-4, $(p, v_0)$ is jointly configured from $\{(\frac{1}{2}, \frac{1}{4}), (\frac{1}{4}, \frac{1}{4}), (\frac{1}{4}, \frac{1}{8})\}$, i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3=N_{SB}\times R$ where $N_{SB}$ is the number of SBs for CQI reporting. In one example, M is replaced with $M_v$ to show its dependence on the rank value v, hence p is replaced with $p_v$, $v\in\{1,2\}$ and $v_0$ is replaced with $p_v$, $v\in\{3,4\}$.

A UE can be configured to report $M_v$ FD basis vectors in one-step from $N_3$ basis vectors freely (independently) for each layer $l\in\{1, \ldots, v\}$ of a rank v CSI reporting. Alternatively, a UE can be configured to report $M_v$ FD basis vectors in two-step as follows.

In step 1, an intermediate set (InS) comprising $$N_3' < N_3$$

basis vectors are selected/reported, wherein the InS is common for all layers.

In step 2, for each layer $l\in\{1, \ldots, v\}$ of a rank v CSI reporting, $M_v$ FD basis vectors are selected/reported freely (independently) from $N_3'$ basis vectors in the InS.

In one example, one-step method is used when $N_3\leq19$ and two-step method is used when $N_3>19$. In one example, $$N_3' = \lceil \alpha M_v \rceil$$

where $\alpha > 1$ is either fixed (to 2 for example) or configurable.

The codebook parameters used in the DFT based frequency domain compression (Eq. 5) are (L, $p_v$ for $v \in \{1,2\}$, $p_v$ for $v \in \{3,4\}$, $\beta$, $\alpha$, $N_{ph}$). The set of values for these codebook parameters are as follows.

L: the set of values is $\{2,4\}$ in general, except $L \in \{2,4,6\}$ for rank 1-2, 32 CSI-RS antenna ports, and R=1.

($p_v$ for $v \in \{1,2\}$, $p_v$, for $v \in \{3,4\}$)$\in \{(\frac{1}{2}, \frac{1}{4}), (\frac{1}{4}, \frac{1}{4}), (\frac{1}{4}, \frac{1}{8})\}$.

$\beta \in \{\frac{1}{4}, \frac{1}{2}, \frac{3}{4}\}$.

$\alpha = 2$ $N_{ph} = 16$.

The set of values for these codebook parameters are as in Table 1.

TABLE 1

| paramCombination | L | $P_v$ | | $\beta$ |
|---|---|---|---|---|
| | | $v \in \{1, 2\}$ | $v \in \{3, 4\}$ | |
| 1 | 2 | $\frac{1}{4}$ | $\frac{1}{8}$ | $\frac{1}{4}$ |
| 2 | 2 | $\frac{1}{4}$ | $\frac{1}{8}$ | $\frac{1}{2}$ |
| 3 | 4 | $\frac{1}{4}$ | $\frac{1}{8}$ | $\frac{1}{4}$ |
| 4 | 4 | $\frac{1}{4}$ | $\frac{1}{8}$ | $\frac{1}{2}$ |
| 5 | 4 | $\frac{1}{4}$ | $\frac{1}{4}$ | $\frac{3}{4}$ |
| 6 | 4 | $\frac{1}{2}$ | $\frac{1}{4}$ | $\frac{1}{2}$ |
| 7 | 6 | $\frac{1}{4}$ | — | $\frac{1}{2}$ |
| 8 | 6 | $\frac{1}{4}$ | — | $\frac{3}{4}$ |

In Rel. 17 (further enhanced Type II port selecting codebook), $M \in \{1,2\}$, $$L = \frac{K_1}{2}$$

where $K_1 = \alpha \times P_{CSIRS}$, and codebook parameters (M, $\alpha$, $\beta$) are configured from Table 2.

TABLE 2

| paramCombination-r17 | M | $\alpha$ | $\beta$ |
|---|---|---|---|
| 1 | 1 | $\frac{3}{4}$ | $\frac{1}{2}$ |
| 2 | 1 | 1 | $\frac{1}{2}$ |
| 3 | 1 | 1 | $\frac{3}{4}$ |
| 4 | 1 | 1 | 1 |
| 5 | 2 | $\frac{1}{2}$ | $\frac{1}{2}$ |
| 6 | 2 | $\frac{3}{4}$ | $\frac{1}{2}$ |
| 7 | 2 | 1 | $\frac{1}{2}$ |
| 8 | 2 | 1 | $\frac{3}{4}$ |

The above-mentioned framework (Eq. 5) represents precoding-matrices for multiple ($N_3$) FD units using a linear combination (double sum) over 2L (or $K_1$) SD beams/ports and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad \text{(Eq. 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (Eq. 5) and space-time (Eq. 5A) frameworks.

The present disclosure focuses on a measuring a CS-RS burst that can be used to obtain time-domain (TD) or Doppler-domain (DD) component(s)/properties of the channel. The measured channel can be used to report TDCP or DD components, either alone (separate) or together with the other CSI components (e.g., based on space-frequency compression).

Figure 14:
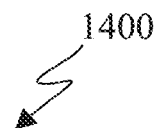
FIG. 14 illustrates an example of a UE configured to receive a burst of NZP CSI-RS resource(s) according to embodiments of the present disclosure.
Figure 14:
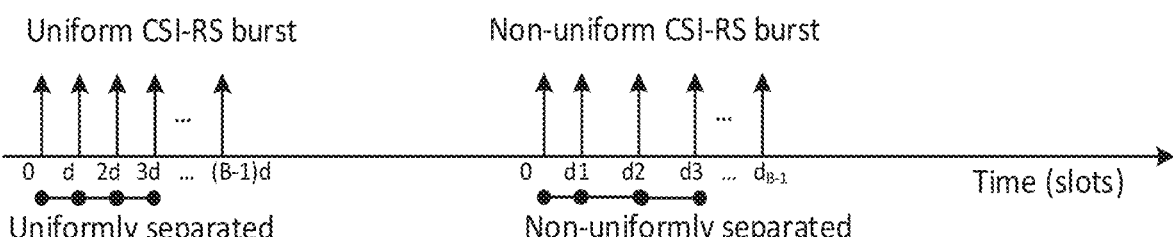

FIG. 14 illustrates an example of a UE configured to receive a burst of non-zero power (NZP) CSI-RS resource(s) 1400 according to embodiments of the present disclosure. The embodiment of the UE configured to receive the burst of NZP CSI-RS resource(s) 1400 illustrated in FIG. 14 is for illustration only. FIG. 14 does not limit the scope of this disclosure to any particular implementation of the UE configured to receive a burst of NZP CSI-RS resource(s).

In one embodiment, as shown in FIG. 14, a UE is configured to receive a burst of non-zero power (NZP) CSI-RS resource(s), referred to as CSI-RS burst for brevity, within B time slots comprising a measurement window, where $B \geq 1$. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1 = d_1$, $e_2 = d_2 - d_1$, $e_3 = d_3 - d_2$, ..., so on, where $e_i \neq e_j$ for at least one pair (i,j) with $i \neq j$.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{Sc}$, then $h_t = \text{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, $1 \rightarrow 2 \rightarrow 3 \rightarrow$ and so on, implying that the concatenation starts from the first dimension, then moves second dimension, and continues until the last dimension. Let $H_B = [h_0 \ h_1 \ \ldots \ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_s \phi_s^H$$

where $\Phi=[\phi_0\ \phi_1\ \ldots\ \phi_{N-1}]$ is a Doppler domain (DD) basis matrix whose columns comprise basis vectors, $C=[c_0\ c_1\ \ldots\ c_{N-1}]$ is a coefficient matrix whose columns comprise coefficient vectors, and $N<B$ is the number of DD basis vectors. Since the columns of $H_B$ are likely to be correlated, a DD compression can be achieved when the value of $N$ is small (compared to the value of $B$). In this example, the Doppler component(s) of the channel is represented by the DD basis matrix $\Phi$ and the coefficient matrix $C$.

Figure 15:
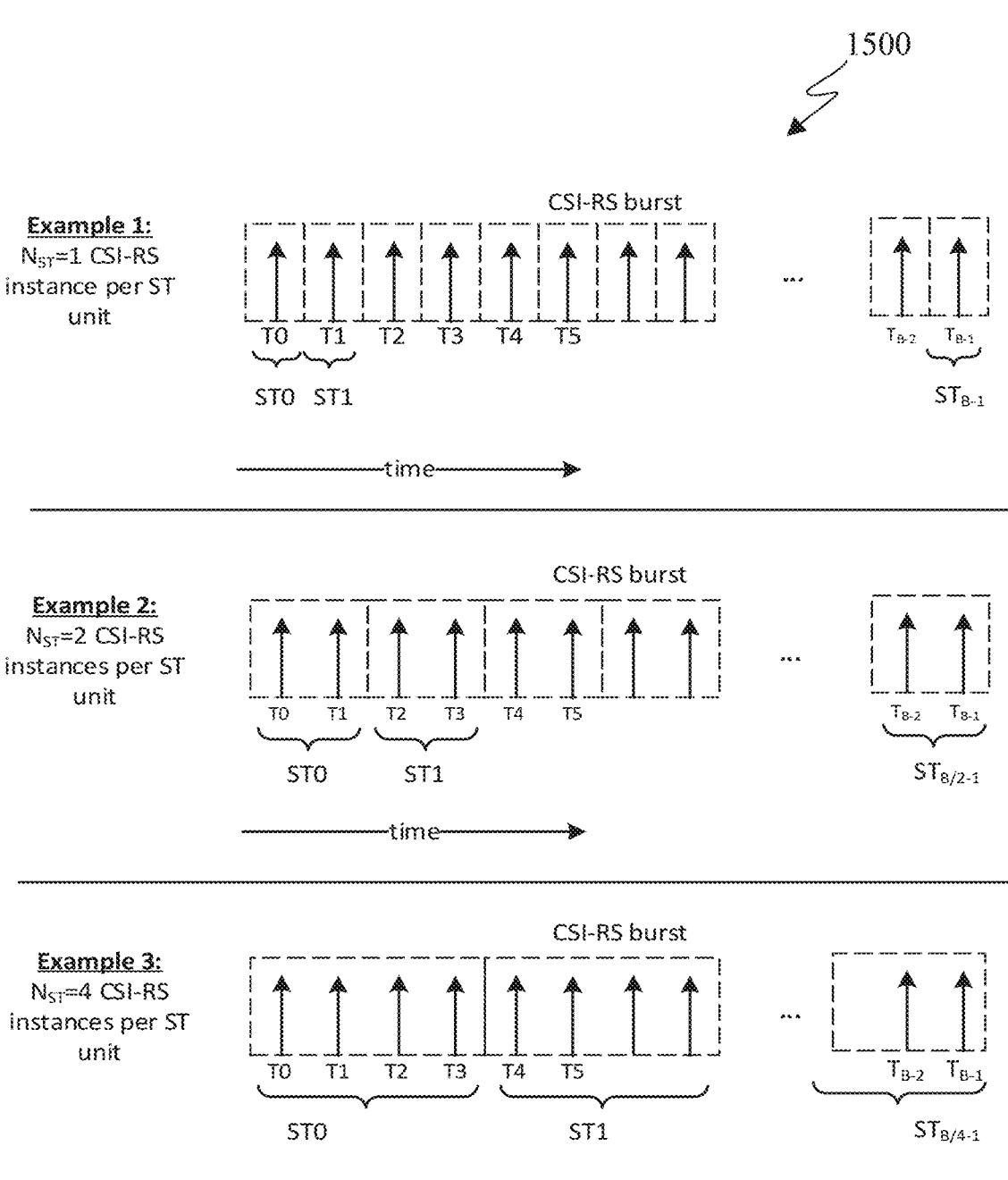
FIG. 15 illustrates an example of a UE configured to determine a value of $N_4$ based on the value B in a CSI-RS burst according to embodiments of the present disclosure.

FIG. 15 illustrates an example of a UE configured to determine a value of $N_4$ based on the value $B$ in a CSI-RS burst 1500 according to embodiments of the present disclosure. The embodiment of the UE configured to determine a value of $N_4$ based on the value $B$ in a CSI-RS burst 1500 illustrated in FIG. 15 is for illustration only. FIG. 15 does not limit the scope of this disclosure to any particular implementation of the UE configured to determine a value of $N_4$ based on the value $B$ in a CSI-RS burst.

Let $N_4$ be the length of the basis vectors $\{\phi_s\}$, e.g., each basis vector is a length $N_4\times1$ column vector.

In one embodiment, a UE is configured to determine/report a CSI report, where the CSI report includes TDCP or Doppler component(s) of the channel. Such a configuration can be via higher layer CSI-ReportConfig including reportQuantity set to 'new quantity' or 'TDCP' or 'DD', where 'new quantity' corresponds to at least one of the following.

In one example, 'new quantity' or 'TDCP' or 'DD' is (or is based on or corresponds to) Doppler spread.

In one example, 'new quantity' or 'TDCP' or 'DD' is (or is based on or corresponds to) Doppler shift.

In one example, 'new quantity' or 'TDCP' or 'DD' is (or is based on or corresponds to) UE speed.

In one example, 'new quantity' or 'TDCP' or 'DD' is (or is based on or corresponds to) time-domain correlation.

In one example, a linear prediction model is assumed to predict channel coefficient(s) (amplitude/phase) variations over time.

In one example, the linear prediction model corresponds to $c_t=p_i\times c_{t-1}$, where $c_t$ is a predicted channel coefficient at time slot t, and $p_1$ is a predictor coefficient. When $t=1$ (reference time), $c_0$ is a reference predictor coefficient, which can correspond to a reference (e.g., CSI reference resource) or a latest (TypeII) CSI reported in an earlier slot.

In one example, the linear prediction model corresponds to $c_t=p_1\times c_{t-1}+p_2\times c_{t-2}$, where $c_t$ is a predicted channel coefficient at time slot t, and $p_i$ for $i=1,2$ is a predictor coefficient. When $t=1$ (reference time), $c_0$ is a reference predictor coefficient, which can correspond to a reference (e.g., CSI reference resource) or a latest (TypeII) CSI reported in an earlier slot.

In one example, the linear prediction model corresponds to $$c_t = \sum_{i=1}^{p} p_i c_{t-i},$$

where p is a number (length) of predictor coefficients, $c_t$ is a predicted channel coefficient at time slot t, and $p_i$ for $i=1,2$ is a predictor coefficient. When $t=1$ (reference time), $c_0$ is a reference predictor coefficient, which can correspond to a reference (e.g., CSI reference resource) or a latest (TypeII) CSI reported in an earlier slot.

In one example, a time-domain or DD compression is used to report time domain correlation. For example, a CSI-RS burst (e.g., based on a TRS) measured within a measurement window, details as described in this disclosure, can be used to obtain time-domain channel measurements within the measurement window and a Type II (linear combination of basis vectors) like framework is configured to report compressed time-domain or DD channel components. In one example, the reported content includes a set of N basis vectors (e.g., TD or DD basis vectors) $\Phi=[\phi_0\ \phi_1\ \ldots\ \phi_{N-1}]$ (e.g., DFT) and corresponding coefficients $\{c_0,\ \ldots\ c_{N-1}\}$. In one example, vectors $\phi_0\ \phi_1\ \ldots\ \phi_{N-1}$ can be length-N orthogonal DFT vectors. In one example, each coefficient is represented as $c_n=a_n\phi_n$, where $a_n$ and $\phi_n$ respectively are amplitude (or power) and phase values. In one example, amplitude/phase of all N coefficients are reported. In one example, amplitude/phase of $N-1$ coefficients are reported, and amplitude/phase of the one remaining coefficient $c_{n*}$ is not reported. The amplitude/phase of the coefficient $c_{n*}$ can be fixed (e.g., to 1). The index n* of the coefficient $c_{n*}$ can be fixed (e.g., to 1), or reported (e.g., as part of the reporting as the strongest/reference coefficient index), or is configured to the UE (e.g., via higher layer, or MAC CE, or DCI).

In one embodiment, the reporting, as described above, can be configured based on (or linked to) $X\geq1$ NZP CSI-RS resources (which can be included in a CSI-RS resource set). In one example, such NZP CSI-RS resources correspond to TRS (CSI-RS for tracking). When $X>1$, at least one of the following examples is used/configured for reporting.

In one example, one TDCP or DD components of the channel is reported per CSI-RS resource. So, there are X separate reports (one for each CSI-RS resource) or X components (one for each CSI-RS resource) in the (single) reported CSI report. In this case, the UE determine the multiple reports/components using the respective CSI-RS resource.

In one example, one (joint) TDCP or DD components of the channel is reported across all CSI-RS resources (regardless of the value of X). In this case, the UE can combine/aggregate all CSI-RS measurements across all resources, and then determine the report using the aggregated measurements.

In one example, a subset of Z CSI-RS resources can be selected, and the TDCP or DD components of the channel can be reported only using (for) the selected CSI-RS resources. The information (e.g., Z value and/or the indices of the selected resources) about the selection can be provided/reported by the UE, e.g., as part of the report. A two-part UCI is used when Z is reported by the UE. Alternatively, the value of Z can be fixed, or configured, and the information (e.g., the indices of the selected resources) about the selection can be provided/reported by the UE, e.g., as part of the report. For the selected resources, the report can be separate or one (joint) as described above.

The information about the selection can be reported via an indicator. In one example, a new indicator (separate from existing indicators) is used. In one example, an existing indicator is used. For example, CRI (or PMI or PMI component) is used.

In one example, one (single) joint indicator (new indicator, or CRI, or PMI, or PMI component) is used to indicate Z selected CSI-RS resource(s).

In one example, multiple separate indicator(s) is/are used, i.e., one indicator (new indicator, or CRI, or PMI, or PMI component) is used to indicate each of the Z selected CSI-RS resource(s).

In one embodiment, for TDCP or Doppler component reporting (or a CSI reporting that includes TDCP or Doppler components), a UE is configured to receive a CSI reporting setting (e.g., via higher layer CSI-ReportConfig) that is linked to a CSI resource setting (e.g., via higher layer CSI-ResourceConfig), and includes the higher layer parameter reportQuantity set to other than 'none', where the CSI resource setting includes NZP CSI-RS resource set(s) for tracking. That is, the CSI-Resource setting contains (reference) ID(s) of $S \geq 1$ NZP CSI-RS resource set(s), and each NZP CSI-RS resource set is configured via higher layer NZP-CSI-RS-ResourceSet configured with higher layer parameter trs-Info. Each NZP-CSI-RS-ResourceSet consists of Either four periodic NZP CSI-RS resources in two consecutive slots with two periodic NZP CSI-RS resources in each slot, or two periodic NZP CSI-RS resources in one slot.

Such a NZP CSI-RS resource is referred to as tracking RS (TRS) later in this disclosure.

Also, NZP-CSI-RS-ResourceSet(s) may have the CSI-RS resources configured as:

Periodic, with the CSI-RS resources in the NZP-CSI-RS-ResourceSet configured with same periodicity, bandwidth and subcarrier location.

Periodic CSI-RS resources in one set and aperiodic CSI-RS resources in a second set, with the aperiodic CSI-RS and periodic CSI-RS resources having the same bandwidth (with same RB location) and the aperiodic CSI-RS being configured with qcl-Type set to 'typeA' and 'typeD', where applicable, with the periodic CSI-RS resources.

Each CSI-RS resource is configured by the higher layer parameter NZP-CSI-RS-Resource with some restrictions. For example, each resource is a single port CSI-RS resource with density $\rho = 3$.

The rest of the details about NZP CSI-RS resources for tracking (TRS) can be as described in Section 5.1.6.1.1 of [REFS].

When TRS is configured for CSI (or TDCP or Doppler component) reporting with reportQuantity set to other than 'none', a value of S can be according to at least one of the following examples.

In one example, a value of S is fixed (e.g., to S=1) when TRS is configured for CSI reporting with reportQuantity set to other than 'none'.

In one example, a value of S is can be 1 or more than 1 (e.g., S=2) based on the configuration, The value S>1 can be subject to UE capability reporting (i.e., only when the UE supports, it can be configured).

Also, when TRS is configured for CSI (or TDCP or Doppler component) reporting with reportQuantity set to other than 'none', there can be at least one restriction on such a TRS. A few examples of the restriction are as follows.

In one example, TRS can only be a periodic NZP CSI-RS resource.

In one example, the periodicity and slot offset for periodic NZP CSI-RS resources, as given by the higher layer parameter periodicityAndOffset configured by NZP-CSI-RS-Resource, is $2^{\mu}X_p$ slots, where $X_p$ is fixed (e.g., 10) and where $\mu$ is defined in Clause 4.3 of [REF 10].

Note that when TRS is a periodic NZP CSI-RS resource, it can be used/configured to measure a CSI-RS burst for TDCP or Doppler component reporting. This can be achieved by associating a measurement window (comprising B>1 time slots) from the TRS measurement instances/occasions to the reporting. In one example, the measurement window is defined/configured based on a CSI reference resource (cf. 5.2.2.5, REFS). In one example, the measurement window can be fixed, or configured, or reported by the UE. In one example, the measurement window can be identified based on a starting (first or reference) time slot ($T_0$) and a number of time slots B (starting from the first time slot).

In one example, both $T_0$ and B are fixed.

In one example, both $T_0$ and B are configured.

In one example, both $T_0$ and B are reported by the UE.

In one example, $T_0$ is fixed and B is configured.

In one example, $T_0$ is fixed and B is reported.

In one example, $T_0$ is configured and B is fixed.

In one example, $T_0$ is configured and B is reported.

In one example, $T_0$ is reported and B is configured.

In one example, $T_0$ is reported and B is fixed.

When configured, the measurement window is configured via RRC (e.g., as a parameter in CSI-ReportConfig). Alternatively, it is indicated via MAC CE or DCI. When reported, the measurement window is reported via CSI (e.g., as a CSI parameter).

When TRS is configured for CSI (or TDCP or Doppler component) reporting with reportQuantity set to other than 'none', the higher layer parameter timeRestrictionForChannelMeasurements in CSI-ReportConfig can be determined/configured according to at least one of the following examples.

In one example, timeRestrictionForChannelMeasurements in CSI-ReportConfig is set to 'notConfigured'. The UE is expected to be configured with timeRestriction-ForChannelMeasurements='notConfigured'. Alternatively, the UE is not expected to be configured with timeRestrictionForChannelMeasurements='configured'.

In one example, timeRestrictionForChannelMeasurements in CSI-ReportConfig is set to 'configured'. The UE is expected to be configured with timeRestrictionForChannelMeasurements='configured'. Alternatively, the UE is not expected to be configured with timeRestrictionForChannelMeasurements='notConfigured'.

If the higher layer parameter timeRestrictionForChannelMeasurements in CSI-ReportConfig is set to 'notConfigured', the UE shall derive the channel measurements for CSI (or TDCP or Doppler component) reporting in uplink slot n based on only the NZP CSI-RS, no later than the CSI reference resource, (defined in REF10) associated with the CSI resource setting.

If the higher layer parameter timeRestrictionForChannelMeasurements in CSI-ReportConfig is set to 'configured', the UE shall derive the channel measurements for CSI (or TDCP or Doppler component) reporting in uplink slot n based on only the most recent, no later than the CSI reference resource, occasion of NZP CSI-RS (defined in REF10) associated with the CSI resource setting.

Depending on the value of the reportQuantity (for example, when CQI is included in the CSI reporting), at least one interference measurement resource (IMR) can also be configured via CSI-ReportConfig. The IMR can be a CSI-IM resource or a NZP CSI-RS configured for interference measurement.

Examples of reportQuanity set to other than 'none' are provided later in this disclosure.

The content of the CSI report (including TDCP or Doppler components reporting) configured via reportQuantity set to other than 'none', as described above, is configured according to at least one of the following embodiments.

In one embodiment, reportQuantity set to other than 'none' corresponds to a separate report.

In one example, reportQuantity='new quantity' or 'TDCP' or 'DD', where the new quantity is according to (corresponds to) at least one of the examples described above.

In one example, reportQuantity=an existing indicator 'I', which indicates one of the TDCP or Doppler components as described above.

In one example, 'I'='PMI' or 'PMI component'.

In one example, 'I'='CRI'.

The time-domain behavior for such reporting can be configured according to at least one of the following examples.

In one example, the TD behavior is fixed to periodic (P).

In one example, the TD behavior is fixed to semi-persistent on PUCCH (SPonPUCCH).

In one example, the TD behavior is fixed to semi-persistent on PUSCH (SPonPUSCH).

In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

When configured, the TD behavior of the CSI-Report-Config is indicated by the higher layer parameter report-ConfigType.

In one embodiment, reportQuantity set to other than 'none' corresponds to a joint report, wherein the joint report comprises (A) the TDCP or Doppler component of the channel and (B) the other CSI parameters from {CRI, LI, PMI, CQI, RI}.

At least one of the following examples is used/configured regarding the reportQuantity.

In one example, reportQuantity set to 'cri-RI-LI-PMI-CQI-X', where cri-RI-LI-PMI-CQI corresponds to (B), and X corresponds to 'new quantity' or 'TDCP' or 'DD' for (A).

In one example, reportQuantity set to 'RI-LI-PMI-CQI-X', where RI-LI-PMI-CQI corresponds to (B), and X corresponds to 'new quantity' or 'TDCP' or 'DD' for (A).

In one example, reportQuantity set to 'cri-RI-PMI-CQI-X', where cri-RI-PMI-CQI corresponds to (B), and X corresponds to 'new quantity' or 'TDCP' or 'DD' for (A).

In one example, reportQuantity set to 'RI-PMI-CQI-X', where RI-PMI-CQI corresponds to (B), and X corresponds to 'new quantity' or 'TDCP' or 'DD' for (A).

In one example, reportQuantity set to 'cri-RI-CQI-X', where cri-RI-CQI corresponds to (B), and X corresponds to 'new quantity' or 'TDCP' or 'DD' for (A).

In one example, reportQuantity set to 'RI-CQI-X', where RI-CQI corresponds to (B), and X corresponds to 'new quantity' or 'TDCP' or 'DD' for (A).

In one example, reportQuantity set to 'cri-CQI-X', where cri-CQI corresponds to (B), and X corresponds to 'new quantity' or 'TDCP' or 'DD' for (A).

In one example, reportQuantity set to 'CQI-X', where CQI corresponds to (B), and X corresponds to 'new quantity' or 'TDCP' or 'DD' for (A).

In one example, reportQuantity set to 'cri-RI-LI-PMI-CQI', where (A) is reported jointly (together with) one of indicators from {CRI, LI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'RI-LI-PMI-CQI', where (A) is reported jointly (together with) one of indicators from {LI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'cri-RI-PMI-CQI', where (A) is reported jointly (together with) one of indicators from {CRI, RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'RI-PMI-CQI', where (A) is reported jointly (together with) one of indicators from {RI, PMI, CQI} for (B).

For example, PMI={X,Y}, where X corresponds to 'new quantity' or 'TDCP' or 'DD' for (A), and Y corresponds to the PMI components.

In one example, reportQuantity set to 'cri-RI-CQI', where (A) is reported jointly (together with) one of indicators from {CRI, RI, CQI} for (B).

For example, RI={X,Y}, where X corresponds to 'new quantity' or 'TDCP' or 'DD' for (A), and Y corresponds to the RI component.

In one example, reportQuantity set to 'RI-CQI', where (A) is reported jointly (together with) one of indicators from {RI, CQI} for (B).

For example, RI={X,Y}, where X corresponds to 'new quantity' or 'TDCP' or 'DD' for (A), and Y corresponds to the RI component.

In one example, reportQuantity set to 'cri-CQI', where (A) is reported jointly (together with) one of indicators from {CRI, CQI} for (B).

For example, CQI={X,Y}, where X corresponds to 'new quantity' or 'TDCP' or 'DD' for (A), and Y corresponds to the CQI component.

In one example, reportQuantity set to 'CQI', where (A) is reported jointly (together with) CQI for (B).

For example, CQI={X,Y}, where X corresponds to 'new quantity' or 'TDCP' or 'DD' for (A), and Y corresponds to the CQI component.

The CQI reporting can help/assist NW implementations such as scaling for MU precoding. Also, the CQI reporting can provide accurate interference information to the NW.

At least one of the following examples is used/configured regarding the NZP CSI-RS resource(s) and/or resource set(s).

In one example, the NZP CSI-RS resource(s) are configured common for both (A) and (B). That is, the CSI-ResourceConfig includes CSI-RS resource set(s) that are used common for both (A) and (B). In one example, the number of resource sets is fixed to 1.

In one example, two types of resource sets linked to (configured within) a CSI reporting.

SetType1: CSI-RS resource set(s) configured with trs-Info, i.e., sets comprising TRS(s)

SetType2: CSI-RS resource set(s) configured without trs-Info, i.e., sets comprising NZP CSI-RS resources for normal CSI A set with SetType1 is configured for reporting of (A), and a set with SetType2 is configured for reporting of (B).

Let S1 be a number of sets with SetType1, and S2 be a number of sets with SetType2.

In one example, (S1,S2) is fixed, e.g., (1,1) or (2,1).

In one example, (S1,S2)=(z,1), and a value of z depends on the configuration. In one example, z can take a value from {1,2}.

In one example, (S1,S2) depends on the configuration.

Let R1 be a number of resources in each of the S1 sets with SetType1, and R2 be a number of resources in each of the S2 sets with SetType2.

In one example, (R1,R2) is fixed, e.g., (4,1) or (2,1).

In one example, (R1,R2)=(2,1) or (4,1) based on a condition.

In one example, the condition is based on the FR type. For instance, (R1,R2)=(2,1) for FR2, and (R1,R2)= (4,1) for FR1. Alternatively, For instance, (R1,R2)= (2,1) for FR2, and (R1,R2)=(2,1) or (4,1) for FR1.

In one example, (R1,R2)=(2, b) or (4, b), where b>1. For example, b=2.

In one example, (R1,R2)=(2, b) or (4, b), where b>=1. For example, b takes a value from {1,2}.

In one example, a CSI-RS resource set in a CSI reporting is partitioned into two subsets/groups of resources.

Group1: CSI-RS resource(s) configured with trs-Info, i.e., resources comprising TRS(s)

Group2: CSI-RS resource(s) configured without trs-Info, i.e., resources comprising NZP CSI-RS resources for normal CSI.

A resource in Group1 is configured for reporting of (A), and a resource Group2 is configured for reporting of (B).

Let W1 be a number of resources in Group1, and W2 be a number of resources in Group2.

In one example, (W1,W2) is fixed, e.g., (4,1) or (2,1).

In one example, (W1,W2)=(2,1) or (4,1) based on a condition.

In one example, the condition is based on the FR type. For instance, (W1,W2)=(2,1) for FR2, and (W1, W2)=(4,1) for FR1. Alternatively, For instance, (W1, W2)=(2,1) for FR2, and (W1,W2)=(2,1) or (4,1) for FR1.

In one example, (W1,W2)=(2, b) or (4, b), where b>1. For example, b=2.

In one example, (W1,W2)=(2, b) or (4, b), where b>=1. For example, b takes a value from {1,2}.

The time-domain behavior for such reporting can be configured according to at least one of the following examples.

In one example, the TD behavior is fixed to periodic (P).

In one example, the TD behavior is fixed to semi-persistent on PUCCH (SPonPUCCH).

In one example, the TD behavior is fixed to semi-persistent on PUSCH (SPonPUSCH).

In one example, the TD behavior is fixed to aperiodic (AP).

In one example, the TD behavior is configured from {P, SPonPUCCH}.

In one example, the TD behavior is configured from {P, SPonPUSCH}.

In one example, the TD behavior is configured from {P, AP}.

In one example, the TD behavior is configured from {AP, SPonPUCCH}.

In one example, the TD behavior is configured from {AP, SPonPUSCH}.

In one example, the TD behavior is configured from {SPonPUCCH, SPonPUCCH}.

In one example, the TD behavior is configured from {P, SPonPUCCH, SPonPUCCH}.

In one example, the TD behavior is configured from {AP, SPonPUCCH, SPonPUCCH}.

In one example, the TD behavior is configured from {P, AP, SPonPUCCH}.

In one example, the TD behavior is configured from {P, AP, SPonPUSCH}.

In one example, the TD behavior is configured from {P, SPonPUCCH, SPonPUCCH, SP}.

Figure 16:
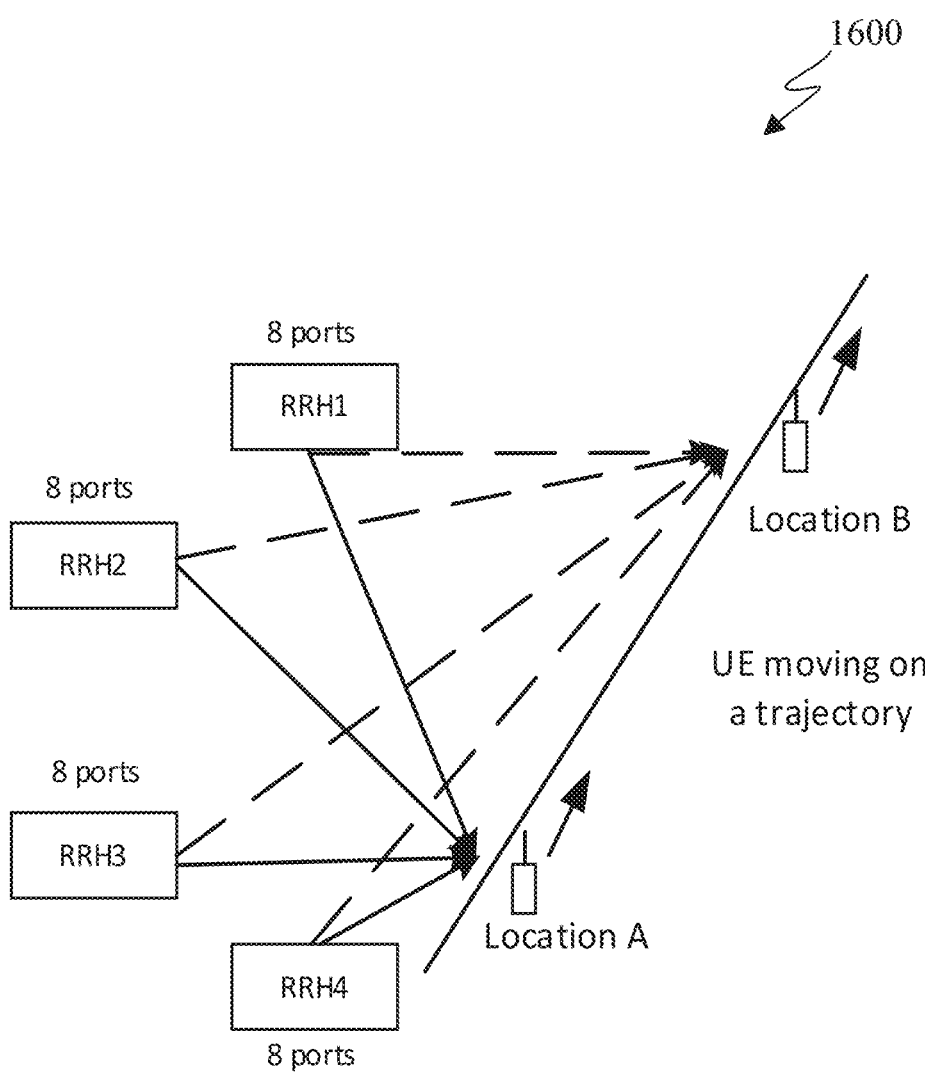
FIG. 16 illustrates a UE moving on a linear trajectory in a distributed multiple-input multiple-output (DMIMO) system according to embodiments of the present disclosure.

FIG. 16 illustrates a UE moving on a linear trajectory in a DMIMO system 1600 according to embodiments of the present disclosure. The embodiment of the UE moving on a linear trajectory in a DMIMO system 1600 illustrated in FIG. 16 is for illustration only. FIG. 16 does not limit the scope of this disclosure to any particular implementation of the UE moving on a linear trajectory in a DMIMO system.

Abovementioned embodiments on the TDCP or Doppler component reporting can be extended to the case of multiple RRHs/TRPs or distributed MIMO system, wherein CSI-RS resource(s) are transmitted from multiple locations (RRHs/TRPs) within a cell. An illustration of a UE moving on a trajectory located in such a system is shown in FIG. 16. While the UE moves from a location A to another location B at high speed (e.g., 60 kmph), the UE measures the channel and the interference (e.g., via NZP CSI-RS resources and CSI-IM resources, respectively), uses them to determine/report CSI considering joint transmission from multiple RRHs. The reported CSI can be based on a codebook, which includes components considering both multiple RRHs, and time-/Doppler-domain channel compression. An RRH/TRP can be associated with (or correspond to) a NZP CSI-RS resource, or a group/subset of ports within a resource.

In one embodiment, a UE is configured to measure TRS resources transmitted from multiple ($N_{RRH}$>1) TRPs/RRHs, and use them report TDCP or Doppler components of the measured channels from multiple RRHs/TRPs.

In one example, the TRS or NZP CSI-RS resource(s) with trs-Info configured for such a reporting is according to at least one of the following examples.

In one example, the number of NZP CSI-RS resources (M) in a CSI-RS resource set is $N_{RRH}$, i.e., one resource for each TRP/RRH.

In one example, the number of NZP CSI-RS resources (M) in a CSI-RS resource set is $\geq N_{RRH}$, at least one for each TRP/RRH. The M resources can be partitioned into $N_{RRH}$ subsets, each including at least one resource for an RRH.

In one example, the number of NZP CSI-RS resource sets (S) configured via CSI-ResourceConfig is $N_{RRH}$, one set for each TRP/RRH.

In one example, the number of NZP CSI-RS resource sets (S) configured via CSI-ResourceConfig is $\geq N_{RRH}$, at least one set for each TRP/RRH. The S resource sets can be partitioned into $N_{RRH}$ subsets, each including at least one resource set for an RRH.

In one example, the TDCP or Doppler component reporting is according to at least one of the following examples.

In one example, the TDCP or Doppler component reporting is separate for each of $N_{RRH}$ TRPs/RRHs. So, there are $N_{RRH}$ reports in total. The indicator for this reporting can be a joint indicator. Alternatively, a separate indicator is reported for each TRP. There can be only one CSI-ReportConfig configured for all reports with a reportQuantity that can set to a value other than 'none', details as described earlier. Alternatively, there can be multiple CSI-ReportConfigs (e.g., one for each report) for these reports. The TD behavior of these multiple reports are expected to be configured the same.

In one example, the TDCP or Doppler component reporting is joint for all of $N_{RRH}$ TRPs/RRHs. So, there is only report that is joint for all TRPs.

In one example, the TDCP or Doppler component reporting is only for one of the $N_{RRH}$ TRPs/RRHs. The index of the one TRP is fixed (e.g., 1), or configured (e.g., RRC, MAC CE, or DCI), or reported by the UE (e.g., as part of the CSI report).

In one example, the TDCP or Doppler component reporting is a subset comprising Z out of the $N_{RRH}$ TRPs/RRHs. The value of Z and/or indices of the Z TRPs can be fixed (e.g., 1), or configured (e.g., RRC, MAC CE, or DCI), or reported by the UE (e.g., as part of the CSI report). When Z>1, the reporting for the Z TRPs can be separate or joint.

Figure 17:
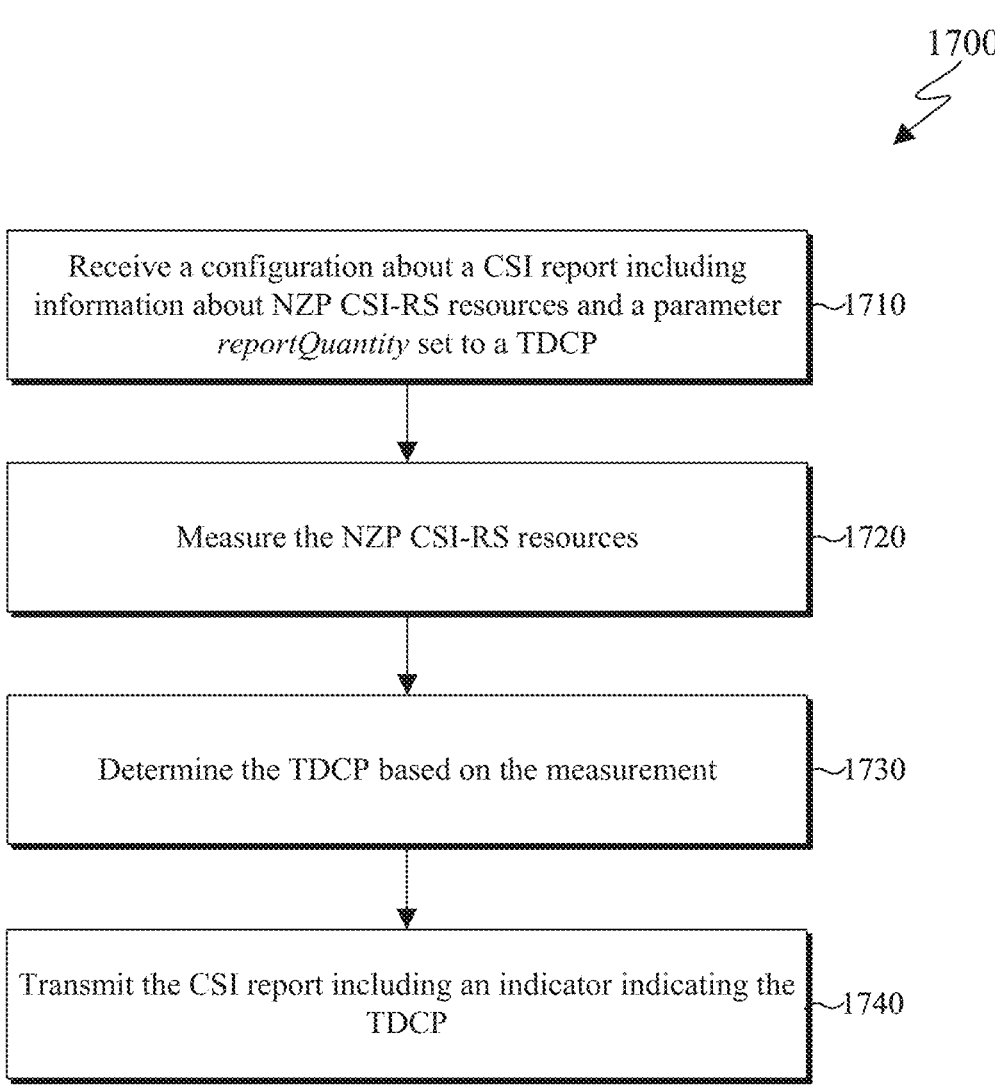
FIG. 17 illustrates a flowchart of a method for reporting of time-domain channel properties according to embodiments of the present disclosure.

FIG. 17 illustrates an example method 1700 for reporting of time-domain channel properties according to embodiments of the present disclosure. The steps of the method 1700 of FIG. 17 can be performed by any of the UEs 111-116 of FIG. 1, such as the UE 116 of FIG. 3 and a corresponding method can be performed by a BS, such as BS 102. The method 1700 is for illustration only and other embodiments can be used without departing from the scope of the present disclosure.

The method begins with the UE receiving a configuration about a CSI report including information about NZP CSI-RS resources and a parameter reportQuantity set to a TDCP (step 1710). For example, in step 1710, the NZP CSI-RS resources are configured as TRS resources via a parameter trs-Info and are included in S≥1 CSI-RS resource sets. For example, each of the S CSI-RS resource sets set may include two periodic NZP CSI-RS resources in one slot, or four periodic NZP CSI-RS resources in two consecutive slots and two periodic NZP CSI-RS resources in each slot. Each of the NZP CSI-RS resources may be a single port CSI-RS resource with a density=3. In various embodiments, the TDCP corresponds to a Doppler spread of a DL channel estimated based on the measurement. In other embodiments, the TDCP corresponds to a time-domain correlation of a DL channel estimated based on the measurement.

The UE then measures the NZP CSI-RS resources (step 1720). For example, in step 1720, the UE may measure the NZP CSI-RS resources based on the received configuration about the CSI report. The UE then determines the TDCP based on the measurement (step 1730). For example, in step 1730, the UE may determine the TDCP based on the received configuration about the CSI report.

The UE then transmits the CSI report including an indicator indicating the TDCP (step 1740). For example, in step 1740, the CSI report is a standalone report including only the TDCP. In another example, the CSI report is a non-standalone report including at least one parameter from: a CQI, a CRI, a RI, a PMI, and LI. In some embodiments, the CSI report is an aperiodic report.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Any of the above variation embodiments can be utilized independently or in combination with at least one other variation embodiment. Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive, via higher layer signaling, a first configuration associated with a channel state information (CSI) report and a second configuration associated with non-zero power (NZP) CSI-reference signal (RS) resources, wherein the first configuration includes a parameter reportQuantity set to a time-domain channel property (TDCP); and
a processor operably coupled to the transceiver, the processor configured to:
perform measurement based on the NZP CSI-RS resources, and
determine the TDCP based on the measurement,
wherein the transceiver is further configured to transmit the CSI report including the determined TDCP,
wherein the NZP CSI-RS resources are included in S≥1 CSI-RS resource sets configured via the higher layer signaling, and
wherein the TDCP is a correlation corresponding to a time-domain measurement window associated with the NZP CSI-RS resources.

2. The UE of claim 1, wherein the NZP CSI-RS resources are configured as tracking RS (TRS) resources via a parameter trs-Info.

3. The UE of claim 2, wherein:
each of the S≥1 CSI-RS resource sets is configured with the parameter trs-Info, and
whether S is higher than 1 is subject to a UE capability report.

4. The UE of claim 1, wherein the TDCP corresponds to a Doppler spread of a downlink (DL) channel estimated based on the measurement.

5. The UE of claim 1, wherein the TDCP corresponds to a time-domain correlation of a downlink (DL) channel estimated based on the measurement.

6. The UE of claim 1, wherein the CSI report is a standalone report including only the TDCP.

7. The UE of claim 1, wherein the CSI report is a non-standalone report including at least one parameter from: a channel quality indicator (CQI), a CSI-RS resource indicator (CRI), a rank indicator (RI), a precoding matrix indicator (PMI), and layer indicator (LI).

8. The UE of claim 1, wherein the CSI report is an aperiodic report.

9. A base station (BS) comprising:

a processor; and a transceiver operably coupled to the processor, the transceiver configured to:

transmit, via higher layer signaling, a first configuration associated with a channel state information (CSI) report and a second configuration associated with non-zero power (NZP) CSI-reference signal (RS) resources, wherein the first configuration includes a parameter reportQuantity set to a time-domain channel property (TDCP);

transmit the NZP CSI-RS resources; and receive the CSI report including the TDCP associated with the NZP CSI-RS resources, wherein the NZP CSI-RS resources are included in S≥1 CSI-RS resource sets configured via the higher layer signaling, and wherein the TDCP is a correlation corresponding to a time-domain measurement window associated with the NZP CSI-RS resources.

10. The BS of claim 9, wherein the NZP CSI-RS resources are configured as tracking RS (TRS) resources via a parameter trs-Info.

11. The BS of claim 10, wherein:

each of the S CSI-RS resource sets is configured with the parameter trs-Info, and whether S is higher than 1 is subject to a UE capability report.

12. The BS of claim 9, wherein the TDCP corresponds to a Doppler spread of a downlink (DL) channel based on the NZP CSI-RS resources.

13. The BS of claim 9, wherein the TDCP corresponds to a time-domain correlation of a downlink (DL) channel based on the NZP CSI-RS resources.

14. The BS of claim 9, wherein the CSI report is a standalone report including only the TDCP.

15. The BS of claim 9, wherein the CSI report is a non-standalone report including at least one parameter from: a channel quality indicator (CQI), a CSI-RS resource indicator (CRI), a rank indicator (RI), a precoding matrix indicator (PMI), and layer indicator (LI).

16. The BS of claim 9, wherein the CSI report is an aperiodic report.

17. A method for operating a user equipment (UE), the method comprising:

receiving, via higher layer signaling, a first configuration associated with a channel state information (CSI) report and a second configuration associated with non-zero power (NZP) CSI-reference signal (RS) resources, wherein the first configuration includes a parameter reportQuantity set to a time-domain channel property (TDCP);

perform measurement based on the NZP CSI-RS resources;

determining the TDCP based on the measurement; and transmitting the CSI report including the determined TDCP, wherein the NZP CSI-RS resources are included in S≥1 CSI-RS resource sets configured via the higher layer signaling, and wherein the TDCP is a correlation corresponding to a time-domain measurement window associated with the NZP CSI-RS resources.

18. The method of claim 17, wherein the NZP CSI-RS resources are configured as tracking RS (TRS) resources via a parameter trs-Info.

19. The method of claim 18, wherein:

each of the S CSI-RS resource sets is configured with the parameter trs-Info, and whether S is higher than 1 is subject to a UE capability report.

20. The method of claim 17, wherein the CSI report is: (i) a standalone report including only the TDCP or (ii) an aperiodic report.

*    *    *    *    *